(12) United States Patent
Dufford

(10) Patent No.: US 9,574,472 B1
(45) Date of Patent: Feb. 21, 2017

(54) SYSTEM AND METHOD FOR INCREASING ENGINE SOUND DURING A DOWNSHIFT

(71) Applicant: Toyota Motor Engineering & Manufacturing North America, Inc., Erlanger, KY (US)

(72) Inventor: Mohammad E. Dufford, Los Angeles, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/835,521

(22) Filed: Aug. 25, 2015

(51) Int. Cl.
*F01N 1/16* (2006.01)
*F01N 9/00* (2006.01)

(52) U.S. Cl.
CPC ............... *F01N 1/168* (2013.01); *F01N 9/00* (2013.01)

(58) Field of Classification Search
CPC .............................. F01N 1/168; G10K 15/02
USPC .................... 181/206, 254; 381/71.4
See application file for complete search history.

(56) References Cited

U.S. PATENT DOCUMENTS

| | | | |
|---|---|---|---|
| 7,353,791 B2 | 4/2008 | Sasaki et al. | |
| 7,975,802 B2 | 7/2011 | Yokoya et al. | |
| 8,300,842 B2 | 10/2012 | Vaishya | |
| 8,322,486 B2 | 12/2012 | Ohta et al. | |
| 8,384,528 B2 * | 2/2013 | McCarthy | G10K 15/02 123/184.21 |
| 8,457,323 B2 | 6/2013 | Palmestål | |
| 8,542,846 B2 | 9/2013 | Matejczyk et al. | |
| 8,620,001 B2 | 12/2013 | Peachey et al. | |
| 8,831,842 B2 | 9/2014 | Dufford | |
| 2008/0192954 A1 * | 8/2008 | Honji | G10K 15/04 381/86 |
| 2009/0277707 A1 | 11/2009 | Ballard | |
| 2011/0044470 A1 | 2/2011 | Ogata | |
| 2013/0133480 A1 * | 5/2013 | Donnelly | B60K 6/36 74/720 |
| 2013/0186062 A1 * | 7/2013 | Pommerer | G10K 15/02 60/273 |
| 2013/0199487 A1 | 8/2013 | Bernard | |
| 2013/0343570 A1 | 12/2013 | Orth | |
| 2014/0121896 A1 | 5/2014 | Valeri et al. | |
| 2014/0229076 A1 | 8/2014 | Doering et al. | |

FOREIGN PATENT DOCUMENTS

JP 2006-63839 3/2006

* cited by examiner

*Primary Examiner* — Jeremy Luks
(74) *Attorney, Agent, or Firm* — Snell & Wilmer LLP

(57) ABSTRACT

A vehicle includes an engine configured to generate power and noise. The vehicle includes a transmission configured to operate in a first gear corresponding to a first gear ratio and a second gear corresponding to a second gear ratio. The second gear ratio is less than the first gear ratio. The vehicle also includes a noise reduction device coupled to the engine and configured to operate in a first state to reduce the noise of the engine to a first volume and a second state to reduce the noise of the engine to a second volume that is greater than the first volume. The vehicle also includes an electronic control unit (ECU) coupled to the engine, the transmission and the noise reduction device and configured to control the noise reduction device to switch to the second state when the transmission shifts from the second gear to the first gear.

20 Claims, 6 Drawing Sheets

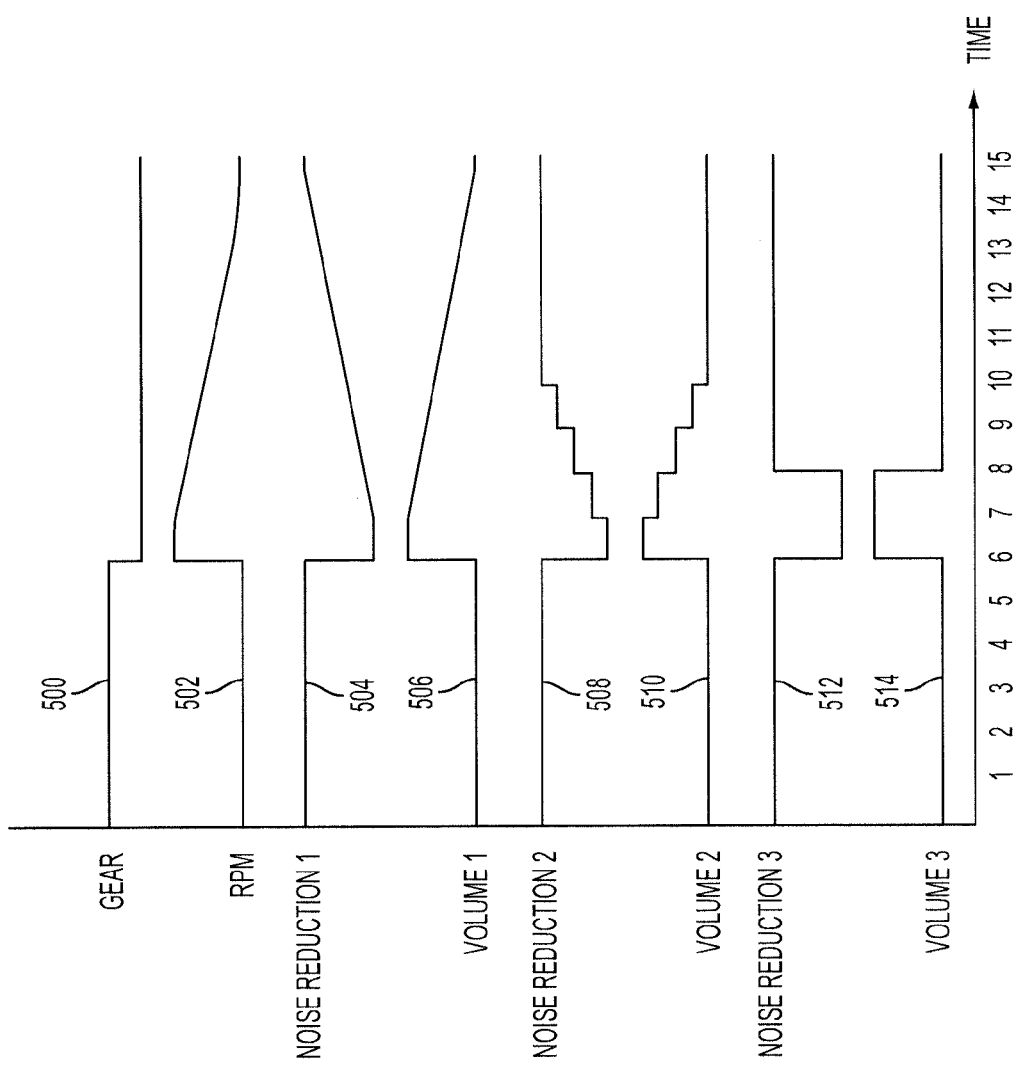

SYSTEM AND METHOD FOR INCREASING ENGINE SOUND DURING A DOWNSHIFT

BACKGROUND

Field

The present disclosure relates to systems and methods for adjusting a volume of engine noise heard in a cabin of a vehicle and, more particularly, for increasing the volume of engine noise heard in the cabin based on a downshift event.

Description of the Related Art

The experience of driving a vehicle can vary from person to person. Some people focus on the vehicle's acceleration, some focus on the noise of the engine, some focus on a combination of these and so forth. Furthermore, most drivers likely still notice features that they do not focus on. For example, a driver who focuses on acceleration may still notice the engine noise from time to time. As vehicle technology advances, some of these features that drivers focus on are becoming more and more difficult to notice from the cabin. For example, the noise reduction technology advanced to the point that the engine noise may be barely audible in the vehicle's cabin. Those drivers who focus on the engine noise during a driving experience may find the lack of noise undesirable. In certain situations, all drivers may find the lack of engine noise to be concerning.

The engine noise of a vehicle changes in volume and pitch as the vehicle performs various functions. For example, as acceleration is requested and the angular velocity of the engine increases, the volume and/or pitch of the engine noise may increase. Drivers with experience driving vehicles that have relatively little noise reduction may find the lack of noise corresponding to an increased angular velocity concerning. For example, they may be concerned that the engine and/or the transmission are not functioning properly. This may be especially true in situations in which the angular velocity of the engine rapidly increases, such as during a downshift of the transmission.

The angular velocity of the engine rapidly increases as a downshift occurs due to the effects of the higher gear ratio of the transmission. Thus, the volume of the engine noise of traditional vehicles increases rapidly as the transmission downshifts. However, the engine noise heard in the cabin of vehicles having certain noise reduction systems may not increase in volume as the transmission downshifts. This may be especially concerning to drivers who may think that the transmission is not operating properly due to the lack of change of volume of the engine noise.

Thus, there is a need for systems and methods for adjusting the volume of the engine noise heard during and after a downshift of a transmission.

SUMMARY

What is described is a vehicle designed to increase an engine sound during a downshift. The vehicle includes an engine configured to generate power at a rotational speed and to generate noise as a byproduct of the power. The vehicle also includes a transmission coupled to the engine and configured to operate in a first gear corresponding to a first gear ratio and a second gear corresponding to a second gear ratio. The second gear ratio is less than the first gear ratio such that the rotational speed of the engine increases as the transmission is shifted from the second gear to the first gear. The vehicle also includes a noise reduction device coupled to the engine and configured to operate in a first state to reduce the noise of the engine to a first volume and a second state to reduce the noise of the engine to a second volume that is greater than the first volume. The vehicle also includes an electronic control unit (ECU) coupled to the engine, the transmission and the noise reduction device. The ECU is configured to control the noise reduction device to switch from the first state to the second state when the transmission shifts from the second gear to the first gear.

Also described is a vehicle designed to increase an engine sound during a downshift. The vehicle includes an engine configured to generate power at a rotational speed and to generate noise as a byproduct of the power. The vehicle also includes an air intake port coupled to the engine and configured to allow air to flow to the engine. The vehicle also includes an exhaust port coupled to the engine and configured to receive exhaust from the engine. The vehicle also includes a transmission coupled to the engine and configured to operate in a first gear corresponding to a first gear ratio and a second gear corresponding to a second gear ratio. The second gear ratio is less than the first gear ratio such that the rotational speed of the engine increases as the transmission is shifted from the second gear to the first gear. The vehicle also includes an engine noise tube coupled to at least one of the air intake port, the exhaust port or the engine. The vehicle also includes a valve coupled to the engine noise tube such that a volume of the noise of the engine is increased when the valve is open. The vehicle also includes an ECU coupled to the engine, the transmission and the valve. The ECU is configured to control the valve to be open when the transmission shifts from the second gear to the first gear.

Also described is a method for increasing engine sound of a vehicle during a downshift. The method includes generating, by an engine of the vehicle, power at a rotational speed and noise as a byproduct of the power. The method also includes shifting, by a transmission, from a second gear ratio to a first gear ratio that is greater than the second gear ratio. The rotational speed of the engine increases when the transmission shifts from the second gear ratio to the first gear ratio. The method also includes controlling, by an ECU, at least one of a noise reduction device or a noise supplementing feature. The noise reduction device and/or the noise supplementing feature causes at least one of the noise of the engine or a supplemental sound of the engine to be increased when the transmission shifts from the second gear ratio to the first gear ratio.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 5A is a time chart illustrating the effect of various noise reduction systems of the vehicle of FIG. 1 as a transmission downshifts according to an embodiment of the present invention.

DETAILED DESCRIPTION

Figure 1:
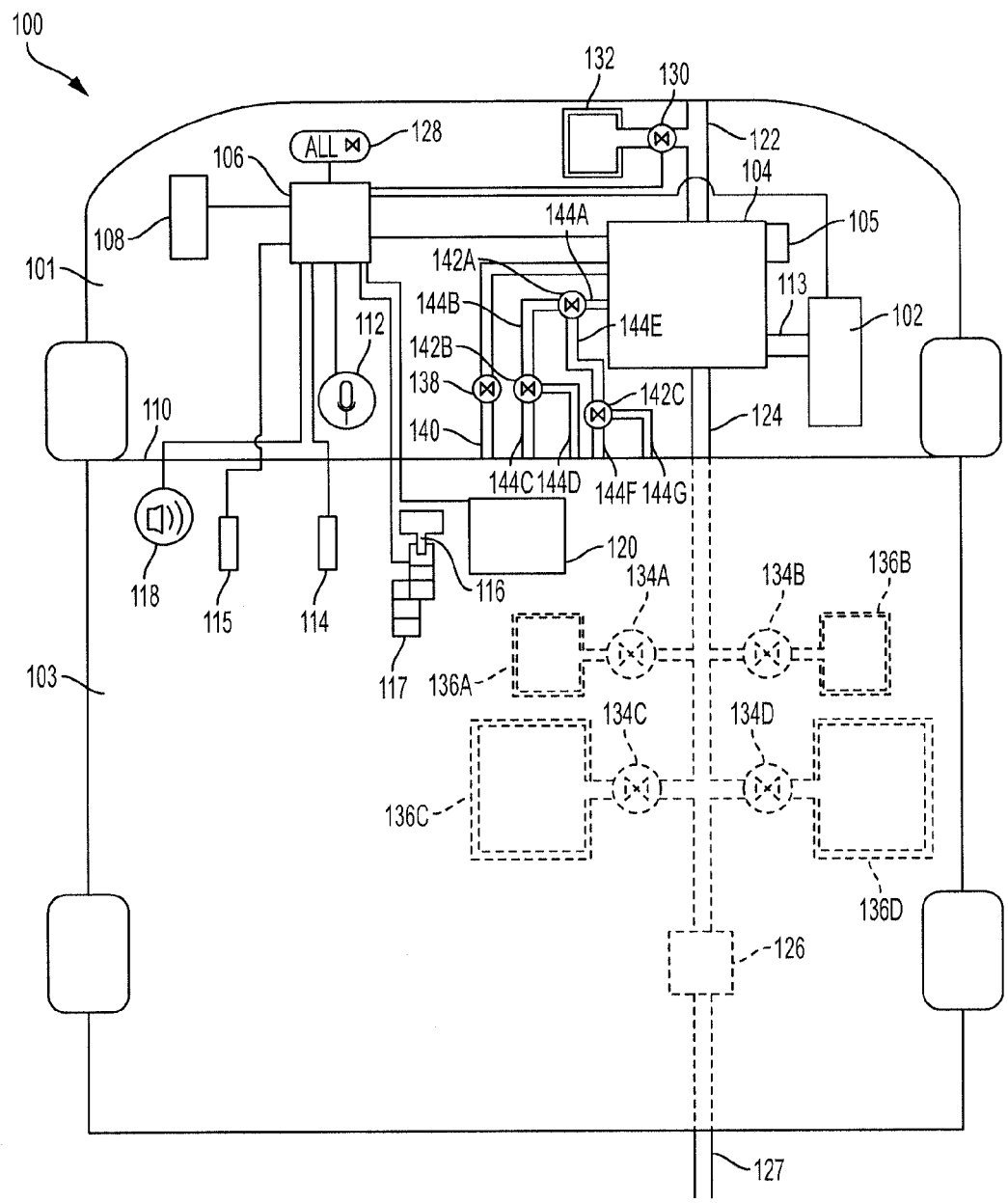
FIG. 1 is a block diagram illustrating components of a vehicle for adjusting the volume of engine noise heard in a cabin based on a downshift event according to an embodiment of the present invention.

Disclosed herein are systems and methods for changing the volume and/or frequency of engine noise heard in the cabin of a vehicle based on a downshift event. The volume may be a measure of the loudness or intensity of the engine noise and, for example, may be measured in decibels (dB). The systems provide several benefits and advantages such as increasing the volume of engine noise heard in the cabin as the transmission is downshifted to a lower gear. The volume increase provides benefits and advantages such as appeasing drivers who focus on the engine noise during a driving experience. The volume increase provides additional benefits and advantages such as providing acoustic feedback to drivers who expect the volume of the engine noise to increase during a downshift event. The systems provide additional benefits and advantages such as a gradual reduction in the volume of the engine noise after the initial increase. The gradual reduction provides benefits and advantages such as allowing the volume of the engine noise to reduce to a level at which it will not interfere with the driver's enjoyment of driving. The gradual reduction provides additional benefits such as providing a more natural feel for the driving experience as the volume of the engine noise in traditional vehicles does not rapidly decrease after a downshift. The systems provide additional benefits and advantages such as providing an option for the driver to reduce the amount that the engine noise increases based on preferences.

An exemplary system includes an engine and a transmission coupled to the engine. The transmission can operate in a plurality of gear ratios and the angular velocity of the engine can be changed by adjusting the gear ratio of the transmission. The system can also include sensors for detecting data corresponding to changes in the gear ratio of the transmission. For example, the sensors can include a gear shifter position sensor, an angular velocity sensor for detecting the angular velocity of the engine or a sensor for detecting a position of a clutch pedal. The system can also include noise reduction or supplementation features such as a microphone for detecting engine noise and a speaker for outputting an inverse signal corresponding to the detected engine noise. The noise reduction or supplementation features can also or instead include one or more engine noise tubes for allowing sound to travel towards the cabin and one or more valves for controlling the amount of noise allowed to travel towards the cabin. The noise reduction and supplementation features can also or instead include one or more resonance chambers for dampening the engine noise and one or more valves for controlling the amount of engine noise allowed to reach the resonance chambers. The system can also include an ECU for determining when the transmission downshifts based on logic and/or data detected by sensors. The ECU can also cause the volume of the engine noise to increase in response to determining that a downshift has occurred and cause the volume of the engine noise to reduce after a predetermined amount of time has expired from the downshift.

With reference now to FIG. 1, a vehicle 100 can include an engine compartment 101 and a cabin 103 separated from the engine compartment 101 by a wall 110. The wall 110 may be, for example, a firewall. The vehicle 100 can include an engine 104 mechanically coupled to a transmission 102, both of which may be positioned in the engine compartment 101. The vehicle 100 can also include a clutch 113 for coupling the engine 104 to different gears of the transmission 102. The vehicle 100 may also include an intake tube 122, an exhaust tube 124, a muffler 126 and a tail pipe 127 each directly or indirectly coupled to the engine 104. The vehicle 100 can also include an electronic control unit (ECU) 106 and a memory 108. The vehicle 100 can also include an accelerator pedal 114, a clutch pedal 115, a gear shifter 116, an input/output device 120 and a speaker 118, each of which may be positioned within a cabin of the vehicle 100 such that they are accessible or usable by a driver and/or a passenger of the vehicle 100. The vehicle 100 can also include one or more sensors including a microphone 112 or other audio sensor and an angular velocity sensor 105. The vehicle can also include one or more valves 128 coupled to one or more engine noise tubes 140, 144 and/or one or more resonance chambers 132, 136.

The engine 104 may be an internal combustion engine capable of combusting a fuel to generate mechanical power such as rotation having torque and an angular velocity. In some embodiments, the vehicle 100 may have a motor generator and a battery instead of or in addition to the engine 104. The motor generator may convert electric charge stored in the battery into mechanical power. In that regard, the vehicle 100 may be a gas-powered vehicle, an electric vehicle, or a hybrid vehicle. In some embodiments, the vehicle 100 may include one or more additional or alternative power generation systems such as a fuel cell or a hybrid combination including fuel cell technology. The engine 104 and/or another power generation system may generate noise as a byproduct of the power generation. The noise may increase in volume as the engine 104 increases its angular velocity.

Figure 2:
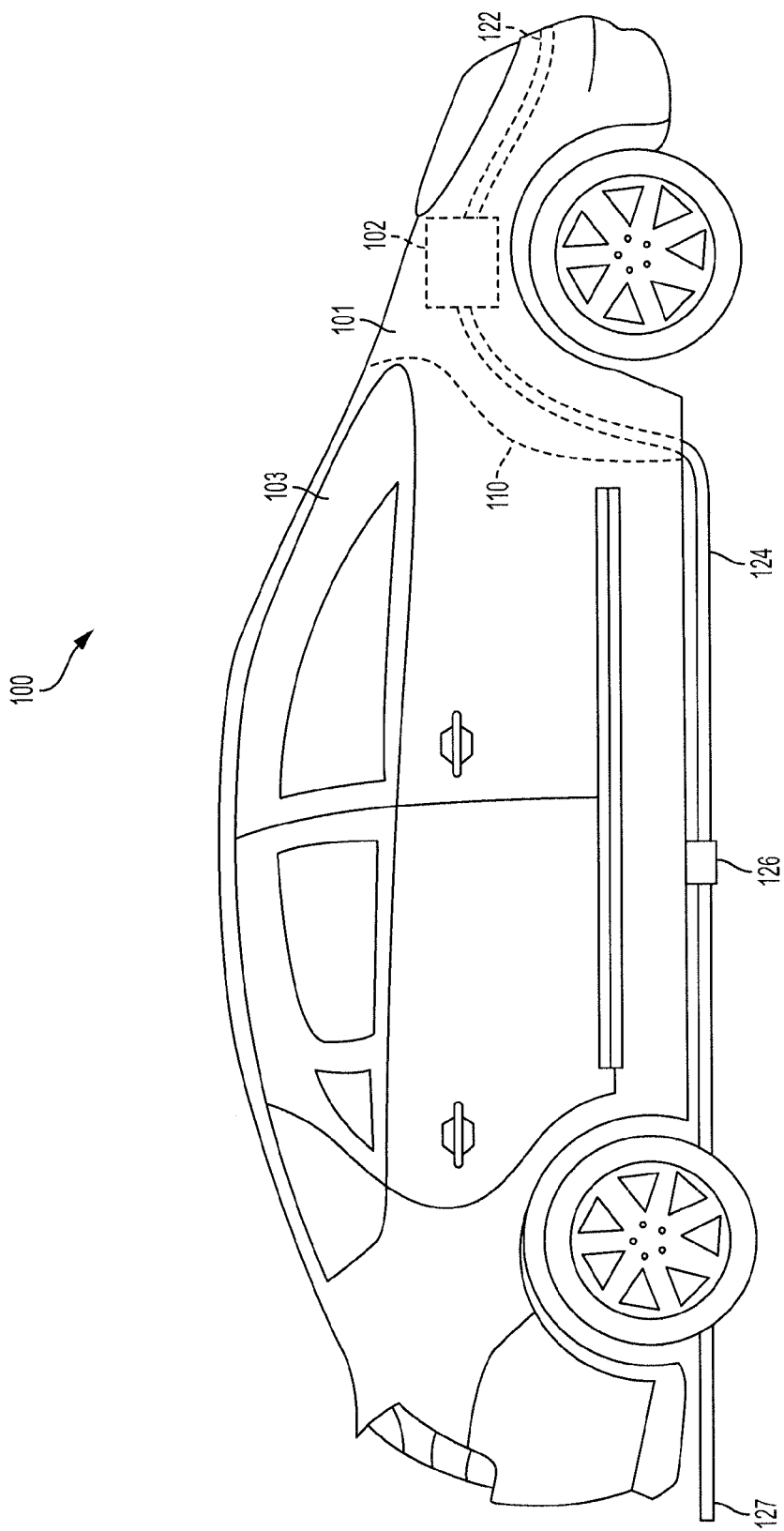
FIG. 2 is a side view of a vehicle illustrating an intake tube, an exhaust tube and a tail pipe of the vehicle relative to an engine compartment and a cabin according to an embodiment of the present invention.

With reference to FIGS. 1 and 2, air may be received and passed to the engine 104 by the intake tube 122. The engine 104 may combine the air and fuel to generate the power and may generate exhaust as a byproduct. The exhaust may flow through the exhaust tube 124 which may be connected to the engine 104 in the engine compartment 101 and extend towards a rear of the vehicle 100. The exhaust tube 124 may be external to the cabin 103, for example, beneath the cabin 103 and coupled to an undercarriage (not shown) of the vehicle 100. Relatively little sound from the exhaust tube 124 is heard in the cabin 103 because the exhaust tube 124 is external to the cabin 103 and the muffler 126 is coupled to the exhaust tube 124. The exhaust may exit the vehicle 100 via the tail pipe 127 which is likewise positioned external to the cabin 103. The muffler 126 may be coupled to the exhaust tube 124 and/or the tail pipe 127 and can dampen the engine noise prior to the noise exiting the vehicle via the tail pipe 127. In some embodiments, the exhaust may be treated by a catalytic converter (not shown) prior to flowing out of the tail pipe 127.

Returning to FIG. 1, the transmission 102 can include any type of transmission such as a manual transmission, an automatic transmission, a continuously variable transmission (CVT), or a combined transmission such as a tiptronic transmission or a semi-automatic transmission (SAT). The transmission 102 can receive power from the engine 104 and convert it to power having a different torque and/or a different angular velocity. The transmission 102 can function in various gear ratios with the higher gear ratios providing a relatively low angular velocity and a relatively high torque and the lower gear ratios providing a relatively high angular velocity and a relatively low torque. Thus, when the transmission 102 downshifts (i.e., increases in gear ratio), the angular velocity of the engine 104 increases, thus increasing the volume of the engine noise.

The ECU 106 may be electrically coupled to some or all of the components of the vehicle 100. In some embodiments, the ECU 106 can include one or more processors or controllers specifically designed for automotive systems, and the functions of the ECU 106 can be implemented in a single ECU or in multiple ECUs. The ECU 106 can receive data from one or more components and control the operation of one or more components based on received or determined data. For example, the ECU 106 can receive data from the gear shifter 116 and control the transmission 102 based on the data received from the gear shifter 116. As another example, the ECU 106 can control actuators within the engine 104 to improve the performance of the engine 104.

The memory 108 may be coupled to the ECU 106 and may be a RAM or other volatile or nonvolatile memory. The memory 108 may be a non-transitory memory or a data storage device, such as a hard disk drive, a solid state disk drive, a hybrid disk drive, or other appropriate data storage, and may further store machine-readable instructions which may be loaded and executed by the ECU 106.

The accelerator pedal 114 can be used by the driver to request acceleration and can be coupled to the ECU 106. In some embodiments, the ECU 106 can cause the engine 104 to accelerate and/or change the gear ratio of the transmission 102 when acceleration is requested by the driver. For example, when the transmission is an automatic transmission and a driver requests an increase in acceleration, the ECU 106 may cause the transmission 102 to downshift to a higher gear ratio in order to increase the angular velocity of the output power. In some embodiments when the transmission 102 is a CVT and acceleration is requested, the ECU 106 may continuously increase the gear ratio of the transmission 102 or may downshift between predetermined gear ratios. The CVT can simulate gear shifting in an automatic transmission in response to a requested acceleration increase by downshifting between predetermined gear ratios.

The gear ratio of the transmission 102 may also be changed based on input from the gear shifter 116. The gear shifter 116 may have various designs based on the type of transmission 102. For example, the gear shifter 116 may be an automatic gear shifter (having park, drive, neutral and reverse gears), a manual gear shifter (having reverse and multiple drive gears), one or more paddle shifters or the like.

The clutch pedal 115 can be used to control the clutch 113. In that regard, the clutch pedal 115 can be coupled to the ECU 106 and/or to the clutch 113 for controlling the coupling of the engine 104 to the transmission 102. When the clutch pedal 115 is depressed, the clutch 113 is engaged, thus de-coupling the transmission 102 from the engine 104. In this state, the driver can manually select a gear of the transmission 102 via the gear shifter 116. As the clutch pedal 115 is released, the clutch 113 is disengaged, coupling the engine 104 to the transmission 102 at the gear selected using the gear shifter 116.

The input/output device 120 can include one or more devices such as a button, a dial, a microphone, a touchscreen, a display, a speaker or the like. The input/output device 120 is coupled to the ECU 106 and can receive user input and/or provide output to a user. In that regard, the user can communicate with the ECU 106 via the input/output device 120. For example, the driver may be able to provide data to the ECU 106 and/or receive feedback from the ECU 106 via the input/output device 120.

The speaker 118 can output audio data, such as audio data determined by the ECU 106. In some embodiments, the speaker 118 can be used in conjunction with the microphone 112 and the ECU 106 to reduce engine noise. For example, the microphone 112 can detect audio data corresponding to engine noise and transmit the detected audio data to the ECU 106. The ECU 106 can determine an inverse signal corresponding to the engine noise and instruct the speaker 118 to output the inverse signal to at least partially cancel out the engine noise, effectively reducing the volume of engine noise heard in the cabin 103.

The angular velocity sensor 105 may be coupled to the engine 104, the transmission 102 and/or any other component from which it can detect an angular velocity corresponding to the angular velocity of the engine 104. In some embodiments, the relative volume of the engine 104 may be estimated based on the detected angular velocity of the engine 104.

Vehicles are currently being manufactured that include noise reduction devices such as mufflers or resonance chambers, and/or that include noise reduction logic in which an inverse of the engine noise is played through speakers, in order to reduce the volume of the engine noise that is heard in the cabin 103. These devices and logic typically reduce the engine noise by a predetermined amount for all states of the engine. However, drivers of traditional vehicles may be accustomed to an increase in volume of the engine noise as a transmission downshifts. The increase in volume may be caused by the increase in engine speed that is caused by the downshift. Drivers of vehicles having traditional noise reduction technology may become concerned when they do not hear an increase in volume as the transmission downshifts. Thus, it is desirable for the volume of the engine noise to increase as the transmission 102 is downshifted. It may be further desirable for the volume of the engine noise to decrease within a predetermined time of the downshift as a continued increase in engine noise may be unpleasant.

The vehicle 100 includes logic and features for detecting when the transmission 102 downshifts. In some embodiments, the transmission 102 may be an automatic transmission, a CVT or a hybrid transmission such that the ECU 106 controls shifting of the transmission 102. For example, as the vehicle 100 decelerates, the ECU 106 may cause the transmission 102 to downshift when the engine 104 reaches a predetermined angular velocity so that the transmission 102 is at a proper gear ratio should the driver need to accelerate from the current vehicle speed.

Figure 3B:
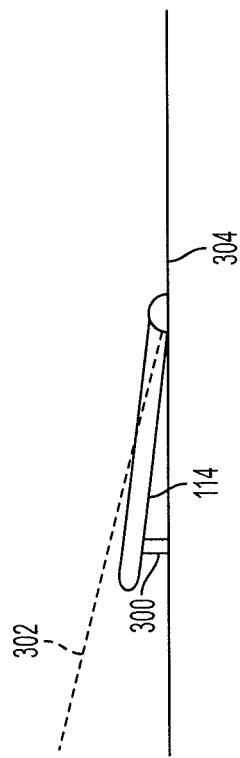
FIGS. 3A and 3B are side views of an accelerator pedal of the vehicle of FIG. 1 illustrating operation of a kick-down switch of the vehicle according to an embodiment of the present invention.
Figure 3A:
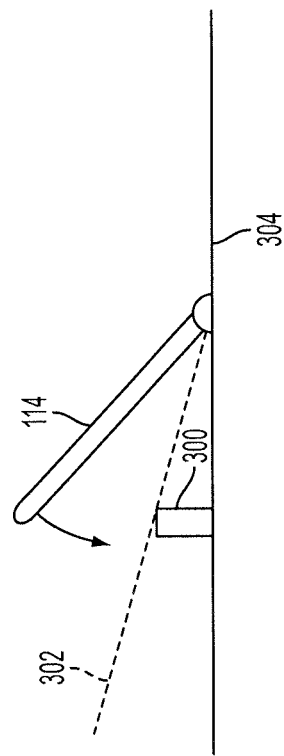

As another example and with reference to FIGS. 1, 3A and 3B, the vehicle 100 may include a kick-down switch 300 coupled to the ECU 106. The kick-down switch 300 may include any sensor or logic capable of detecting the position of the accelerator pedal 114 relative to a floorboard 304 of the vehicle 100. In particular, the kick-down switch 300 may detect or determine if the accelerator pedal 114 crosses a predetermined plane 302. For example, the kick-down switch 300 may include a button that becomes depressed and transmits a signal when the accelerator pedal 114 crosses the plane 302. In some embodiments, the ECU 106 can cause the transmission 102 to downshift in order to increase acceleration when the kick-down switch 300 detects that the accelerator pedal 114 crosses the plane 302.

Returning to FIG. 1, the ECU 106 can also cause the transmission 102 to downshift in other situations. For example, the ECU 106 can cause a downshift when increased power is desirable, such as when additional acceleration is requested without triggering the kick-down switch 300 and/or when the vehicle 100 is traveling up a relatively steep grade.

When the transmission 102 is a CVT, the ECU 106 may cause the transmission 102 to gradually shift gear ratios and/or may cause the transmission 102 to rapidly switch gear ratios to simulate an automatic transmission. The ECU 106 may be designed to increase the volume of the engine noise when the transmission 102 increases the gear ratio at or above a predetermined rate and/or may adjust the volume based on the rate of change of the gear ratio of the CVT. For example, the ECU 106 can cause the volume of the engine noise to increase by a first amount as the transmission 102 increases in gear ratio at a relatively slow rate and to cause the volume of the engine noise to increase by a second amount that is greater than the first amount as the transmission 102 increases in gear ratio at a relatively fast rate.

The ECU 106 can also determine when a manual transmission shifts based on data detected by the gear shifter 116, the clutch pedal 115, the angular velocity sensor 105 and/or any other sensor. The gear shifter 116 may include a position sensor 117 that detects the current position of the gear shifter 116. For example, the position sensor 117 can detect when the gear shifter 116 is in first gear, in second gear or the like. The ECU 106 may be coupled to the position sensor 117 and receive the detected current position of the gear shifter 116. Thus, the ECU 106 can detect a current position of the gear shifter 116 and may determine when the transmission 102 shifts based on the location of the gear shifter 116.

However, manual transmissions may not immediately change gears as the gear shifter 116 is placed in a new position. In that regard, the ECU 106 can more accurately determine the timing of a downshift based on the detected position of the clutch pedal 115 and/or data detected by the angular velocity sensor 105. For example, the transmission 102 may be operatively re-coupled to the engine 104 as the clutch pedal 115 is being released (corresponding to disengagement of the clutch 113). In this regard, the ECU 106 can determine that the transmission 102 has downshifted when the clutch pedal 115 is sufficiently released to cause the clutch 113 to become at least partially engaged. In a similar aspect, the vehicle 100 may include a sensor that detects whether the clutch 113 is engaged or disengaged and the ECU 106 can determine that a downshift has occurred when the clutch 113 becomes disengaged.

The angular velocity of the engine 104 is affected when the transmission 102 downshifts. For example, as the clutch 113 becomes engaged, the transmission 102 is not coupled to the engine 104. However, as the clutch 113 is released after the gear shifter 116 has moved to a lower gear, the transmission 102 becomes operatively coupled to the engine 104. After this reconnection, the higher gear ratio of the transmission 102 causes the angular velocity of the engine 104 to increase and the increase can be detected by the angular velocity sensor 105. The ECU 106 can thus determine when a downshift occurs based on the detected change in angular velocity. For example, a driver may engage the clutch 113 by depressing the clutch pedal 115. The driver may then shift the gear shifter 116 from 5th gear to 4th gear while the clutch 113 is engaged. The clutch 113 becomes disengaged as the driver releases the clutch pedal 115, operatively coupling the transmission 102 to the engine 104. As a result, the angular velocity of the engine 104 increases as the clutch 113 becomes disengaged. Thus, the ECU 106 can determine that a downshift has occurred when the detected angular velocity of the engine 104 increases after the gear shifter 116 has been shifted to a lower gear.

As discussed above, the volume of engine noise that is heard in the cabin 103 of a traditional vehicle (i.e., the vehicle has relatively little or no noise cancellation features or logic) increases when the transmission 102 downshifts and the ECU 106 includes logic for simulating this aspect of traditional vehicles. Methods of transmission shift detection such that the ECU 106 can determine the timing of the shift have been described above. As described below, the ECU 106 can also control one or more features of the vehicle 100 to increase the volume of the engine noise that is heard in the cabin 103. In some embodiments, the ECU 106 can cause the volume of the engine noise heard in the cabin 103 to increase immediately as a downshift occurs and/or to increase within a predetermined time of the downshift.

In one embodiment, the microphone 112 can detect audio data corresponding to the noise of the engine 104 and transmit the detected audio data to the ECU 106. The ECU 106 can then determine an inverse signal corresponding to the engine noise and instruct the speaker 118 to output the inverse of the engine noise at a determined volume. This effectively cancels out at least some of the engine noise, and the amount of engine noise that is cancelled out is based on the volume of the audio from the speaker 118. Thus, when the ECU 106 determines that the transmission 102 has downshifted, the ECU 106 can decrease the volume of the audio from the speaker 118, effectively increasing the volume of the engine noise heard in the cabin 103. In some embodiments, the ECU 106 may also or instead adjust the frequency of the inverse signal such that engine noise of a certain frequency is cancelled out. This allows the engine noise heard in the cabin 103 to be tuned to a frequency that corresponds with the particular function of the engine 104. For example, the ECU 106 may cause only lower frequency engine noise to be cancelled out when the transmission 102 shifts to a higher gear ratio.

In some embodiments, the ECU 106 can cause the volume of the audio from the speaker 118 to return to a value near its pre-shift volume (i.e., within 50 percent (50%) of the pre-shift volume) after a predetermined amount of time has expired from or after completion of the downshift. In some embodiments, the volume of the audio from the speaker 118 may gradually increase to its pre-shift volume, may intermittently increase between the time of the downshift and the expiration of the predetermined amount of time, or may remain at the low volume until the predetermined amount of time has passed and then increase. It may be preferable for the volume of the audio from the speaker 118 to gradually increase in volume as a sudden decrease in volume may alarm a driver.

In some embodiments, the ECU 106 may cause the speaker 118 to output audio data that simulates the sound of the engine 104 when the transmission 102 downshifts. For example, the ECU 106 may instruct the speaker 118 to output a pre-recorded sound that resembles the sound of the engine 104 and/or may instruct the speaker 118 to output audio data that was detected by the microphone 112. In some embodiments, the speaker 118 constantly outputs the audio data and the ECU 106 may cause the volume to increase when a downshift occurs. In some embodiments, the speaker 118 may be caused to output the audio data when the downshift occurs. The ECU 106 may also instruct the speaker 118 to continuously or intermittently decrease the volume until a predetermined amount of time (e.g., 1-5 seconds) has passed. In some embodiments, the ECU 106 may cause the speaker 118 to immediately decrease the volume after the predetermined amount of time has passed.

In other aspects, the ECU 106 can adjust the volume of the engine noise by controlling one or more of the valves 128. For example, the vehicle 100 can include a valve 130 coupled between the intake tube 122 and a resonance chamber 132. The resonance chamber 132 may be configured or designed as a resonator to produce sound at one or more resonant frequencies of the received engine noise. In that regard, the resonance chamber 132 can effectively cancel out at least some of the engine noise. The ECU 106 can control the opening and closing of the valve 130, thus controlling the volume of the engine noise heard in the cabin 103. For example, the ECU 106 can close the valve 130 to increase the volume of the engine noise (by decreasing or reducing the amount of engine noise cancellation) or open the valve 130 to decrease the volume of the engine noise (by increasing or enhancing the amount of engine noise cancellation).

When the transmission 102 has not recently downshifted, the valve 130 may be open and act as a traditional noise reduction device. When the ECU 106 determines that the transmission 102 has downshifted, the ECU 106 may cause the valve 130 to close, effectively increasing the volume of the engine noise. In some embodiments, the valve 130 may only have an open position and a closed position such that the volume increases and decreases are immediate. In some embodiments, the valve 130 can have numerous operative positions between the open position and the closed position (e.g., 100%, 75%, 50%, 25% and 0%) such that the volume can be incrementally or continuously adjusted by changing between the operative positions of the valve 130.

The vehicle 100 can also include a set of valves 134 each positioned between the exhaust tube 124 and the resonance chambers 136. The valves 134 and the resonance chambers 136 may function in a similar manner as the valve 130 and the resonance chamber 132. However, each of the resonance chambers 136 may be designed to reduce the volume of noise at different frequencies or ranges of frequencies. For example, the resonance chamber 136A may be designed to reduce sound at a first frequency and the resonance chamber 136B may be designed to reduce sound at a second frequency that is higher than the first frequency. Thus, the frequency of the engine noise heard in the cabin 103 can be controlled by controlling the positions of the valves 134.

By controlling the frequency of the engine noise heard in the cabin 103, the ECU 106 can cause the engine noise to more closely resemble that of a traditional vehicle. As the angular velocity of the engine 104 increases, the frequency of the engine noise can likewise increase. The ECU 106 can cause the engine noise heard in the cabin 103 to more closely resemble a traditional vehicle by controlling the valves 134 to allow dampening of low frequency noise and reduce dampening of high frequency noise after the downshift. The ECU 106 can also allow a gradual decrease in the engine noise volume and/or frequency. For example, the ECU 106 can control each of the valves 134 to be open or closed so that the frequencies of sound that are not dampened are gradually reduced until the sound heard in the cabin 103 has the same or similar frequency characteristics as the pre-shift sound. In another aspect, the ECU 106 can control one or more of the valves 134 to be partially open (e.g., 20-60 percent open) to allow partial dampening of some frequencies of the engine noise.

Also or instead, each of the resonance chambers 136 may be designed to reduce the volume of the engine noise by a predetermined amount. In some embodiments, the amount of noise reduction provided by each of the resonance chambers 136 is different and in some embodiments, the amount of noise reduction provided by each of the resonance chambers 136 is the same. For example, the ECU 106 may cause each of the valves 134 to be open during non-shift driving times such that the amount of engine noise reduction is at a maximum (i.e., the volume of the engine noise in the cabin 103 is at a minimum). When a downshift occurs, the ECU 106 may cause one or more of the valves 134 to close such that the volume of the engine noise heard in the cabin 103 increases. The ECU 106 may then intermittently open and/or close one or more of the valves 134 to incrementally reduce the volume of the engine noise until all the valves 134 are again open after expiration of the predetermined amount of time. This allows a gradual reduction of the volume of the engine noise after the downshift.

The vehicle 100 may also include an engine noise tube 140 that has a first end connected or adjacent to the engine 104 and a second end positioned near, adjacent to and/or connected to the wall 110. In some embodiments, the second end of the engine noise tube 140 may be in contact with the wall 110 and/or may extend into the cabin 103. The engine noise tube 140 can include a tube constructed from one or more of a metal, plastic or another composition and may include acoustic reflection characteristics. That is, the inside of the tube may be coated or lined with a material that allows for the propagation of acoustic signals or waves. In that regard, sound can propagate between the engine 104 and the cabin 103 via the engine noise tube 140. Depending on the design of the engine noise tube 140, sound may or may not be audible through a wall of the engine noise tube 140.

A valve 138 may be positioned on either end of the engine noise tube 140 and/or anywhere between the two ends. The valve 138 may prevent some or all of the engine noise from reaching the cabin 103 when it is closed and may allow at least some of the engine noise to be heard in the cabin 103 when it is open. The ECU 106 can control the valve 138 to be open or closed based on the state of the transmission 102. When the ECU 106 determines that a downshift has occurred, the ECU 106 can cause the valve 138 to open, allowing the volume of the engine noise heard in the cabin 103 to increase. After a predetermined amount of time, the ECU 106 can cause the valve 138 to be closed, reducing the volume of the engine noise. In some embodiments, the valve 138 may be set to one or more positions between the open position and the closed position such that the amount of noise reduction can be gradually increased.

The vehicle 100 may also include a number of engine noise tubes 144 and valves 142. The first engine noise tube 144A may be connected or adjacent to the engine 104 and receive the engine noise. Other engine noise tubes 144C, 144D, 144F and 144G may be positioned near, adjacent to, against or in contact with the wall 110 and/or may extend into the cabin 103 and be operatively coupled to the first engine noise tube 144A through one or more additional engine noise tubes 144. In that regard, the engine noise can propagate to the cabin 103 via one or more of the engine noise tubes 144. The valves 142 may be coupled to the network of engine noise tubes 144 and controllable by the ECU 106 to adjust the volume of the engine noise heard in the cabin 103.

When the transmission 102 downshifts, the ECU 106 can cause all of the valves 142 to be open, allowing engine noise to be heard in the cabin 103 via the engine noise tubes 144. As time passes after the downshift, the ECU 106 can control the valves 142 to open and/or close to gradually reduce the volume of the engine noise heard in the cabin 103. For example, after a downshift, all valves 142 may be open. After a period of time, the ECU 106 may control the valve 142B to only allow sound to propagate through the engine noise tube 144B and not the engine noise tube 144C. After another period of time, the ECU 106 may control the valve 142B to be closed such that sound does not propagate directly through the engine noise tube 144B or the engine noise tube 144C. The ECU 106 may continue to control the valves 142 to gradually reduce the volume of the engine noise heard in the cabin 103 after the downshift event.

Although the vehicle 100 is illustrated as having many features for increasing a volume of engine noise after a downshift, one skilled in the art will realize that a vehicle can control the volume of the engine noise using only one of the features disclosed herein and/or any combination of the features disclosed herein. Furthermore, additional or alternative noise adjustment features can be implemented without departing from the scope of the disclosure.

Figure 4:
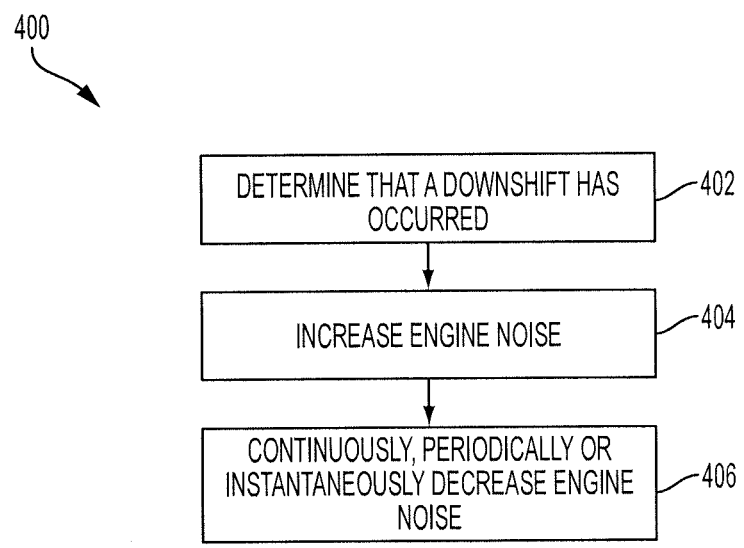
FIG. 4 is a flowchart illustrating a method for adjusting the volume of the engine noise heard in a cabin of a vehicle based on a downshift event according to an embodiment of the present invention.

With reference now to FIG. 4, a method 400 may be performed by a vehicle similar to the vehicle 100 for increasing an amount of engine noise heard after a downshift. The method 400 may include, at 402, detecting or determining that a downshift has occurred. The downshift may be determined by an ECU if the transmission is an automatic transmission, a CVT or a hybrid transmission, as discussed above. If the transmission is a manual transmission, the ECU may determine that the downshift has occurred based on data detected by a gear position sensor, an angular velocity sensor coupled to the engine or the transmission and/or the position of a clutch pedal.

At 404, if the ECU determines that a downshift has occurred, the ECU may cause the volume of the engine noise heard in the cabin to increase at the time of the downshift or within a predetermined time of the downshift. For example, the ECU can control a speaker to supplement the engine noise and/or to reduce an amount of engine noise cancellation. The ECU can also or instead increase the volume by controlling one or more valves coupled to one or more resonance chambers and/or one or more engine noise tubes as described above.

At 406, the ECU can continuously, intermittently or instantaneously cause the volume of the engine noise to decrease. For example, the ECU can control the volume of the speaker and/or can control the valves to be open, closed and/or partially open.

With reference to FIGS. 1 and 5A, effects of noise reduction devices of the vehicle 100 implementing a method similar to the method 400 are shown. Line 500 illustrates a gear of the vehicle 100. As shown, the gear of the transmission is reduced at time 6. The lower gear corresponds to an increase in gear ratio of the transmission. Line 502 illustrates the revolutions per minute (RPM) of the engine. As shown, the RPM increases at time 6 when the gear ratio increases. The RPM also gradually decreases from time 6 until time 15, when it reaches a value that is similar to the pre-shift value. In some embodiments, the RPM may reach a value that is not similar to the pre-shift value due to acceleration, braking or other controls by the driver or the ECU 106.

Line 504 illustrates results of a first noise reduction system in which the ECU 106 instructs the speaker 118 to output a signal that is an inverse of the engine noise. Line 504 corresponds to the amount of noise reduction caused by the speaker 118. Line 506 corresponds to the volume of the engine noise heard in the cabin 103 as the speaker 118 is controlled by the ECU 106. At time 6, the noise reduction value decreases (caused by decreasing the volume of the audio output by the speaker 118), corresponding to an increase in the volume of the engine noise heard in the cabin 103. The ECU 106 may then cause the volume of the inverse signal to gradually increase, corresponding to a gradual decrease of the volume of the engine noise, until time 15. At time 15, the volume of the inverse signal output by the speaker 118 may return to a value near the pre-shift volume. Similarly, at time 15, the volume of the engine noise may reach a value that is similar to the pre-shift value. However, in some embodiments, the volume of the engine noise may reach a value other than the pre-shift volume due to acceleration, braking or other controls by the driver or the ECU 106.

Line 508 illustrates results of a second noise reduction system in which the ECU 106 controls the valves 134 to be open or closed. Line 510 illustrates the volume of the engine noise heard in the cabin as the valves 134 are controlled. Between time 0 and time 6, all of the valves 134 are open, allowing the resonance chambers 136 to reduce the engine noise by a maximum amount. At time 6, each of the valves 134 are closed, reducing an effect of the resonance chambers. As a result, the volume of the engine noise heard in the cabin 103 is increased. One of the valves 134 is opened at time 7, thus causing the volume of the noise in the cabin 103 to decrease. An additional one of the valves 134 is open until time 10, further reducing the volume of the engine noise. In effect, the volume of the engine noise is incrementally reduced.

Line 512 illustrates results of a third noise reduction system in which the ECU 106 controls the valve 138 to be open or closed. Line 514 illustrates the corresponding volume of the engine noise heard in the cabin 103. Between time 0 and time 6, the valve 138 is closed, preventing at least some of the engine noise from reaching the cabin 103 via the engine noise tube 140. In response to the downshift at time 6, the ECU 106 controls the valve 138 to be open such that more of the engine noise can reach the cabin 103. The corresponding increase in volume is shown by line 514. After a predetermined amount of time (corresponding to 2 time units), the valve 138 is again closed, causing the volume to decrease to a value similar to the pre-shift volume.

Figure 5B:
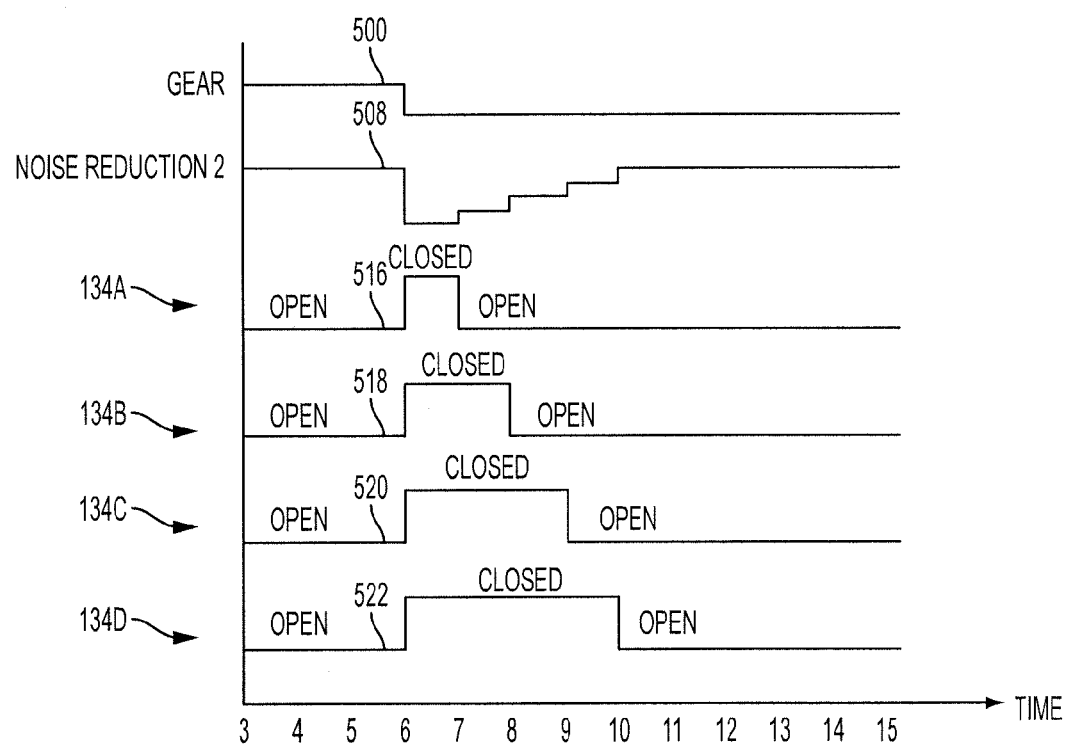
FIG. 5B is a time chart illustrating the operation of a plurality of valves of the vehicle of FIG. 1 that are used as noise reduction devices according to an embodiment of the present invention.

With reference now to FIGS. 1 and 5B, operation of the valves 134 corresponding to the second noise reduction system is shown. At time 6, each of the valves 134 are caused to be closed, thus increasing the volume of the engine noise heard in the cabin 103. At time 7, the valve 134A is open, increasing the noise reduction and thus causing the amount of noise to decrease. At time 8, the valve 134B is open, causing the amount of noise to further decrease. At time 9, the valve 134C is open and at time 10 the valve 134D is open, resulting in the noise reaching a value similar to the pre-shift value. By controlling the valves 134 to open and/or close independently, the ECU 106 can cause the volume of the engine noise to immediately increase upon the downshift and to intermittently decrease as time passes from the downshift.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicle having an engine compartment and a passenger compartment and designed to increase an engine sound during a downshift comprising:
    an engine configured to generate power at a rotational speed and to generate noise as a byproduct of the power;
    a transmission coupled to the engine and configured to operate in a first gear corresponding to a first gear ratio and a second gear corresponding to a second gear ratio that is less than the first gear ratio such that the rotational speed of the engine increases as the transmission is shifted from the second gear to the first gear;
    a tube positioned in the engine compartment of the vehicle and configured to transfer the noise of the engine;
    a valve coupled to the tube and configured to be positioned in a first state to reduce the noise of the engine heard in the passenger compartment of the vehicle to a first volume and a second state to reduce the noise of the engine heard in the passenger compartment of the vehicle to a second volume that is greater than the first volume; and
    an electronic control unit (ECU) coupled to the engine, the transmission and the valve and configured to control the valve to switch from the first state to the second state when the transmission shifts from the second gear to the first gear.

2. The vehicle of claim 1 wherein the ECU is further configured to control the valve to operate in the first state after a predetermined amount of time has expired since the transmission shifted from the second gear to the first gear.

3. The vehicle of claim 2 wherein the ECU is further configured to control the valve to gradually change from the second volume to the first volume.

4. The vehicle of claim 3 further comprising a second tube positioned in the engine compartment of the vehicle and configured to transfer the noise of the engine and a second valve coupled to the second tube and configured to be positioned in at least two states to adjust the noise of the engine heard in the passenger compartment of the vehicle, wherein the ECU is further configured to control the first valve and the second valve to gradually change from the second volume to the first volume by controlling the at least two valves.

5. The vehicle of claim 1 further comprising a resonance chamber coupled to the tube, wherein an amount of sound received by the resonance chamber is reduced when the valve is in a closed configuration.

6. The vehicle of claim 1 wherein the tube extends toward the passenger compartment of the vehicle and is configured to reduce the noise of the engine to the first volume when the valve is closed.

7. The vehicle of claim 1 further comprising at least one of an air intake tube or an exhaust tube and wherein the tube is coupled to at least one of the air intake tube or the exhaust tube.

8. The vehicle of claim 1 further comprising a resonance chamber coupled to the tube and configured to reduce the noise of the engine to the first volume when the valve is open.

9. The vehicle of claim 1 further comprising an input device coupled to the ECU and configured to receive user input requesting that the engine noise be reduced and wherein the ECU is further configured to control the valve to reduce the noise of the engine to a third volume that is between the first volume and the second volume when the transmission shifts from the second gear to the first gear and the user input requests that the engine noise be reduced.

10. The vehicle of claim 1 wherein the ECU is further configured to determine the rotational speed of the engine and to determine that the transmission has shifted from the second gear to the first gear when the rotational speed of the engine increases.

11. The vehicle of claim 1 wherein the transmission is a continuously variable transmission and wherein the first gear and the second gear are logically defined to correspond to the first gear ratio and the second gear ratio.

12. A vehicle designed to increase an engine sound during a downshift comprising:
    an engine configured to generate power at a rotational speed and to generate noise as a byproduct of the power;
    an air intake port coupled to the engine and configured to allow air to flow to the engine;
    an exhaust port coupled to the engine and configured to receive exhaust from the engine;
    a transmission coupled to the engine and configured to operate in a first gear corresponding to a first gear ratio and a second gear corresponding to a second gear ratio that is less than the first gear ratio such that the rotational speed of the engine increases as the transmission is shifted from the second gear to the first gear;
    an engine noise tube coupled to at least one of the air intake port, the exhaust port or the engine;
    a valve coupled to the engine noise tube such that a volume of the noise of the engine is increased when the valve is open; and
    an electronic control unit (ECU) coupled to the engine, the transmission and the valve and configured to control the valve to be open when the transmission shifts from the second gear to the first gear.

13. The vehicle of claim 12 wherein the ECU is further configured to control the valve to be closed at a predetermined amount of time after the transmission shifts from the second gear to the first gear.

14. The vehicle of claim 12 further comprising an input device coupled to the ECU and wherein the ECU is further configured to adjust the valve to be partially open when the transmission shifts from the second gear to the first gear, the noise of the engine having a lower volume when the valve is partially open relative to when the valve is open.

15. The vehicle of claim 12 wherein the ECU is further configured to determine the rotational speed of the engine and determine that the transmission has shifted from the second gear to the first gear when the rotational speed of the engine increases.

16. The vehicle of, claim 12 wherein the transmission is a continuously variable transmission and wherein the first gear and the second gear are logically defined to correspond to the first gear ratio and the second gear ratio.

17. A method for increasing engine sound of a vehicle during a downshift comprising:

generating, by an engine of the vehicle, power at a rotational speed and noise as a byproduct of the power;

shifting, by a transmission, from a second gear ratio to a first gear ratio that is greater than the second gear ratio such that the rotational speed of the engine increases when the transmission downshifts from the second gear ratio to the first gear ratio; and controlling, by an electronic control unit (ECU), a speaker to output a waveform that is an inverse of the noise of the engine to reduce the noise of the engine heard in a passenger compartment of the vehicle to a pre-shift volume;

determining, by the ECU, when the transmission downshifts from the second gear ratio to the first gear ratio; and controlling, by the ECU, the speaker to output the waveform at a lower volume than the pre-shift volume when the transmission downshifts from the second gear ratio to the first gear ratio to increase the noise of the engine that is heard in the passenger compartment of the vehicle when the transmission downshifts.

18. The method of claim 17 further comprising controlling, by the ECU, the speaker to gradually increase a volume of the waveform until the volume of the waveform reaches the pre-shift volume after the transmission completes its downshift from the second gear ratio to the first gear ratio.

19. The method of claim 17 further comprising detecting, by a microphone, the noise of the engine and determining, by the ECU, the inverse of the noise of the engine based on the detected engine sound of the vehicle.

20. The method of claim 17 further comprising storing, in a memory, stored audio data that simulates the noise of the engine and determining, by the ECU, the inverse of the noise of the engine based on the stored audio data that simulates the noise of the engine.

* * * * *